(12) United States Patent
Hodgkinson et al.

(10) Patent No.: US 8,685,574 B2
(45) Date of Patent: Apr. 1, 2014

(54) MICROPOROUS LAYER

(75) Inventors: Adam John Hodgkinson, Swindon (GB); Jonathan David Brereton Sharman, Reading (GB)

(73) Assignee: Johnson Matthey Public Limited Company, London (GB)

( * ) Notice: Subject to any disclaimer, the term of this patent is extended or adjusted under 35 U.S.C. 154(b) by 968 days.

(21) Appl. No.: 12/278,094

(22) PCT Filed: Jan. 18, 2007

(86) PCT No.: PCT/GB2007/050026
§ 371 (c)(1),
(2), (4) Date: Oct. 28, 2008

(87) PCT Pub. No.: WO2007/088396
PCT Pub. Date: Aug. 9, 2007

(65) Prior Publication Data
US 2009/0098440 A1 Apr. 16, 2009

(30) Foreign Application Priority Data
Feb. 1, 2006 (GB) .................................. 0601943.4

(51) Int. Cl.
*H01M 8/22* (2006.01)
*B05D 5/12* (2006.01)

(52) U.S. Cl.
USPC ................................ 429/405; 96/11; 427/115

(58) Field of Classification Search
None
See application file for complete search history.

(56) References Cited

U.S. PATENT DOCUMENTS

| 5,620,807 | A | 4/1997 | Mussell et al. |
| 6,492,431 | B1 | 12/2002 | Cisar |
| 2003/0008195 | A1 | 1/2003 | Chiem et al. |
| 2003/0157396 | A1 | 8/2003 | Beckmann et al. |
| 2003/0157397 | A1 | 8/2003 | Barton et al. |
| 2004/0009389 | A1 | 1/2004 | Sakai et al. |
| 2004/0209154 | A1 | 10/2004 | Ren et al. |

FOREIGN PATENT DOCUMENTS

| EP | 0 582 333 A1 | 2/1994 |
| EP | 0 731 520 A1 | 9/1996 |
| EP | 0 791 974 A1 | 8/1997 |
| EP | 1 369 948 A1 | 12/2003 |
| WO | WO-03/058743 A2 | 7/2003 |
| WO | WO2005/020356 | * 3/2005 |

* cited by examiner

*Primary Examiner* — Patrick Ryan
*Assistant Examiner* — Sarah A Slifka
(74) *Attorney, Agent, or Firm* — RatnerPrestia

(57) ABSTRACT

A component for use in assembling a membrane electrode assembly comprises a microporous layer supported on a transfer substrate, wherein the microporous layer comprises carbon particles and a hydrophobic polymer, and a polymer layer is present on the microporous layer. A process for preparing a component for use in assembling a membrane electrode assembly includes forming the microporous layer on the transfer substrate and applying a polymer layer on the microporous layer. The microporous layer may also be deposited onto a gas diffusion substrate for use in the membrane electrode assembly.

8 Claims, 3 Drawing Sheets

MICROPOROUS LAYER

CROSS-REFERENCE TO RELATED APPLICATIONS

This application is the U.S. National Phase application of PCT International Application No. PCT/GB2007/050026, filed Jan. 18, 2007, and claims priority of British Patent Application No. 0601943.4, filed Feb. 1, 2006, both of which are incorporated herein by reference.

FIELD OF THE INVENTION

The present invention relates to a microporous layer suitable for incorporation into a membrane electrode assembly for use in a fuel cell.

BACKGROUND OF THE INVENTION

A fuel cell is an electrochemical cell comprising two electrodes separated by an electrolyte. A fuel, e.g. hydrogen or methanol, is supplied to the anode and an oxidant, e.g. oxygen or air, is supplied to the cathode. Electrochemical reactions occur at the electrodes, and the chemical energy of the fuel and the oxidant is converted to electrical energy and heat. Fuel cells are a clean and efficient power source, and may replace traditional power sources such as the internal combustion engine in both stationary and automotive power applications. In a proton exchange membrane (PEM) fuel cell, the electrolyte is a solid polymeric membrane which is electronically insulating but ionically-conducting.

The principle component of a PEM fuel cell is known as a membrane electrode assembly (MEA) and is essentially composed of five layers. The central layer is the polymer membrane. On either side of the membrane there is an electrocatalyst layer, typically comprising a platinum-based electrocatalyst. An electrocatalyst is a catalyst that promotes the rate of an electrochemical reaction. Finally, adjacent to each electrocatalyst layer there is a gas diffusion substrate. The gas diffusion substrate must allow the reactants to reach the electrocatalyst layer and must conduct the electric current that is generated by the electrochemical reactions. Therefore the substrate must be porous and electrically conducting.

An MEA can be constructed by several methods. The electrocatalyst layer may be applied to the gas diffusion substrate to form a gas diffusion electrode. Two gas diffusion electrodes can be placed either side of a membrane and laminated together to form the five-layer MEA. Alternatively, the electrocatalyst layer may be applied to both faces of the membrane to form a catalyst coated membrane. Subsequently, gas diffusion substrates are applied to both faces of the catalyst coated membrane. Finally, an MEA can be formed from a membrane coated on one side with an electrocatalyst layer, a gas diffusion substrate adjacent to that electrocatalyst layer, and a gas diffusion electrode on the other side of the membrane.

Typical gas diffusion substrates include substrates based on carbon paper (e.g. Toray® paper available from Toray Industries, Japan), woven carbon cloths (e.g. Zoltek® PWB-3 available from Zoltek Corporation, USA) or non-woven carbon fibre webs (e.g. H-2135 available from Freudenberg, Germany). The carbon substrate is typically modified with a particulate material coated onto one or both planar faces of the substrate (usually just the planar face that will contact the electrocatalyst layer). The particulate material is typically a mixture of carbon black and a polymer such as polytetrafluoroethylene (PTFE). The layer of particulate material is known as a microporous layer. The microporous layer has several functions: it enables water and gas transport to and from the catalyst layer and it provides a smooth surface onto which a catalyst layer may be applied. The layer is electrically conductive and is able to transfer heat away from the electrochemical reaction sites.

Microporous layers are typically applied directly to gas diffusion substrates by techniques such as screen printing. Methods of preparing microporous layers are disclosed in US 2003/0157397. In one method a microporous coating is formed on a substrate having a release surface, such as a polyester or polyimide film, and subsequently transferred to a carbon paper or fabric. The microporous layer of US 2003/0157397 consists of a mixture of carbon and a melt-processable fluorinated polymer.

SUMMARY OF THE INVENTION

The present inventors have sought to provide an alternative method of preparing microporous layers. They have sought to provide a method that can produce continuous and even layers, without obvious discontinuities or undulations. They have sought to provide a method that can provide thin microporous layers, e.g. layers with a thickness of 20 µm or less.

Accordingly, the present invention provides a microporous layer supported on a transfer substrate, wherein the microporous layer comprises carbon particles and a hydrophobic polymer, and characterized in that a polymer layer is present on the microporous layer.

The microporous layer supported on a transfer substrate can be used to provide microporous layers on gas diffusion substrates. The inventors have found that the layer of polymer on the surface of the microporous layer enables the microporous layer to adhere to the gas diffusion substrate. The polymer in the polymer layer can be an adhesive that decomposes when the microporous layer is applied to a gas diffusion substrate, leaving inert carbonaceous residues that do not affect the functioning of a fuel cell. Alternatively, the polymer in the polymer layer can be a hydrophobic polymer such as PTFE. Such a polymer will not decompose when the microporous layer is applied to a gas diffusion substrate, but the presence of such a polymer in a gas diffusion substrate will not adversely affect the functioning of a fuel cell.

DETAILED DESCRIPTION OF THE INVENTION

Figure 1:
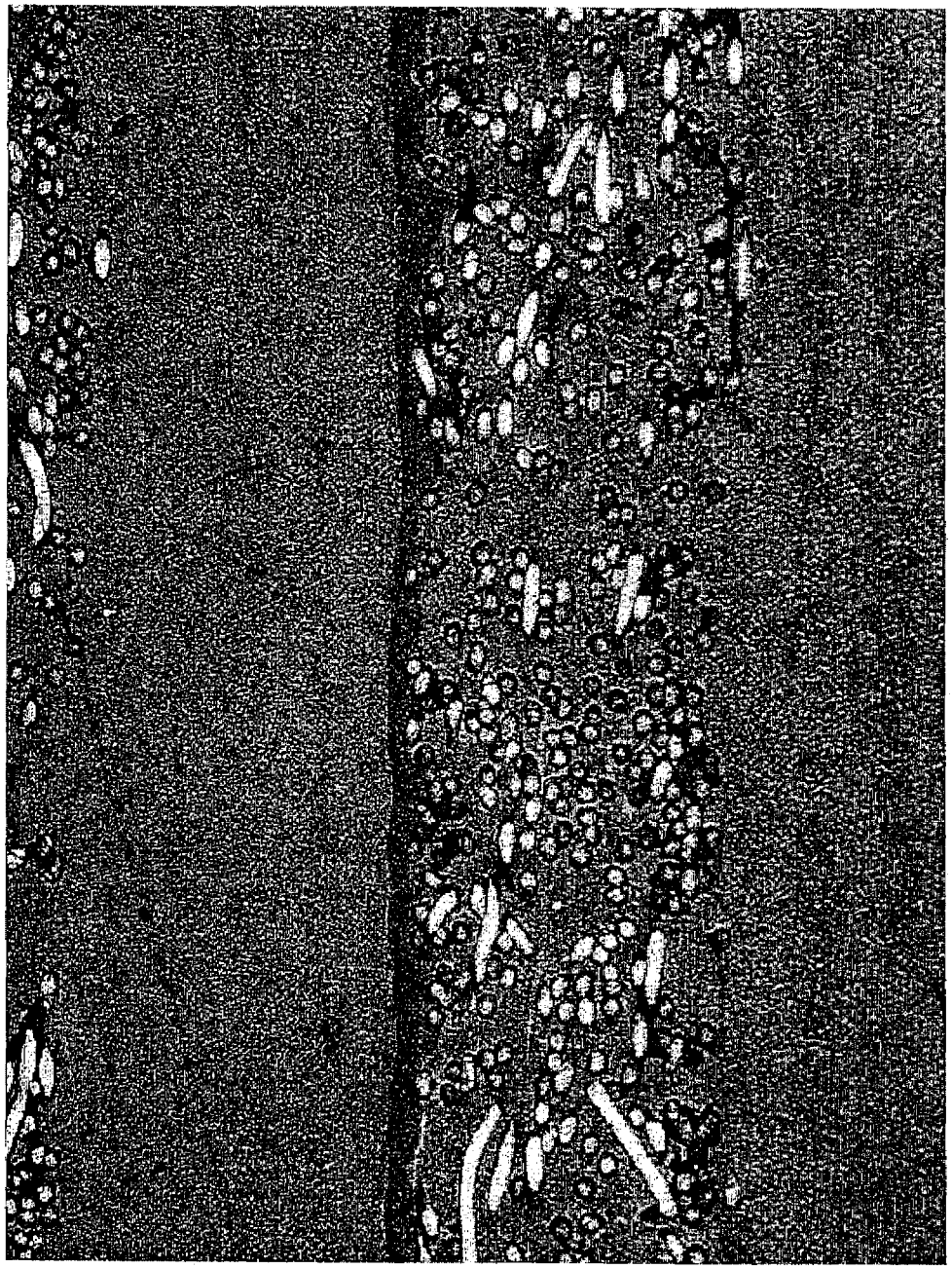
FIG. 1 shows a microscope image of a cross-section of the substrate and microporous layer according to comparative example 1.

The term "carbon particles" is used to describe carbon in any finely divided form, (the longest dimension of any of the particles is suitably less than 500 µm, preferably less than 300 µm, most preferably less than 50 µm) including carbon powders, carbon flakes, carbon nanofibres or microfibres, and particulate graphite. The carbon particles are preferably carbon black particles, for example, an oil furnace black such as Vulcan® XC72R (from Cabot Chemicals, USA) or an acetylene black such as Shawinigan (from Chevron Chemicals, USA) or Denka FX-35 (from Denka, Japan). Suitable carbon microfibres include Pyrograf® PR19 carbon fibres (from Pyrograf Products, USA).

The hydrophobic polymer is suitably a fluoropolymer such as polytetrafluoroethylene (PTFE) or fluorinated ethylene-propylene (FEP), and is preferably PTFE.

The weight ratio of carbon particles to hydrophobic polymer is suitably between 50:1 and 1:1, preferably between 20:1 and 2:1, most preferably about 10:1. Increased amounts of hydrophobic polymer reduce the porosity and conductivity of the microporous layer; whereas decreased amounts of hydrophobic polymer decrease the amount of hydrophobic pathways within the microporous layer and reduce the efficacy of water and gas transport.

The microporous layer is suitably between 5 µm and 100 µm thick, preferably between 10 µm and 40 µm thick. Thinner layers may not provide a sufficiently smooth layer (fibres in the gas diffusion substrate may protrude) and thicker layers may lead to mass transport losses. The thickness of the microporous layer is suitably uniform across the entire layer such that the thinnest portion of the layer is at least 50% as thick as the thickest portion of the layer, preferably at least 75% as thick as the thickest portion of the layer, most preferably at least 90% as thick. The porosity of the layer is suitably greater than 70% to ensure effective mass transport. The pore sizes in the microporous layer preferably cover a wide range, e.g. from 10 µm up to 5 nm.

The microporous layer suitably covers the entire transfer substrate and may be produced as a roll.

The transfer substrate may be any suitable transfer substrate known to those skilled in the art but is preferably a polymeric material such as polypropylene (especially biaxially-oriented polypropylene, BOPP) or a polymer-coated paper such as polyurethane coated paper. The transfer substrate could also be a silicone release paper or a metal foil such as aluminium foil.

In one embodiment of the invention, the polymer layer consists of a layer of adhesive. The adhesive is suitably a thermoplastic adhesive. Suitably the burn-out characteristics of the adhesive are such that the adhesive forms inert carbonaceous residues when heated to its decomposition temperature. The inert residues do not affect the functioning of the fuel cell. Preferably, the mass of the inert residues is 20-60%, more preferably 30-40% of the mass of the adhesive. A preferred adhesive is polyvinyl acetate.

In a further embodiment of the invention, the polymer layer consists of a layer of a hydrophobic polymer such as PTFE. Unlike an adhesive layer, PTFE will not be burnt out when the microporous layer is heated and a PTFE layer will remain in the gas diffusion substrate. This layer will not adversely affect the functioning of the fuel cell.

The amount of polymer on the microporous layer is suitably 0.5 g/m$^2$ to 5 g/m$^2$, preferably 1 g/m$^2$ to 2 g/m$^2$. The polymer layer is suitably present over the entire surface of the microporous layer. Alternatively, if it is desired to have regions of the gas diffusion substrate that are not coated by a microporous layer, then the polymer layer can be incomplete.

The present invention further provides a process for preparing a microporous layer supported on a transfer substrate, wherein a polymer layer is present on the microporous layer, comprising the steps of:
  a) preparing a dispersion comprising carbon particles and a hydrophobic polymer in a solvent;
  b) applying the dispersion to a transfer substrate to form a microporous layer; and
  c) applying a polymer to form a polymer layer on the microporous layer.

In a preferred embodiment of the invention, steps (b) and (c) are performed simultaneously in a multiple-layer cascade coating or curtain coating process.

Dispersions comprising carbon particles and a hydrophobic polymer in a solvent are known to the skilled person. The solvent preferably comprises water and preferably consists essentially of water. The dispersion may comprise a surfactant. The dispersion is suitably prepared by adding carbon particles and the hydrophobic polymer to the solvent and mixing. Methods for preparing such dispersions are disclosed in, for example, US 2003/0008195 and US 2004/0009389.

After the dispersion and polymer are applied, the microporous layer is suitably dried, e.g. at 60° C.

The invention further provides a process for depositing a microporous layer onto a gas diffusion substrate comprising the steps of:
  a) taking a microporous layer supported on a transfer substrate, wherein a polymer layer is present on the microporous layer, and positioning the microporous layer next to a gas diffusion substrate such that the polymer layer is adjacent to the gas diffusion substrate;
  b) pressing the microporous layer to the gas diffusion substrate, such that the polymer bonds to the gas diffusion substrate;
  c) removing the transfer substrate; and
  d) firing.

An advantage of using a solid phase transfer process to prepare a microporous layer is that the layer can be transferred to a range of different gas diffusion substrates. By contrast, liquid phase transfer such as screen-printing requires different formulations for different gas diffusion substrates.

The gas diffusion substrate may be any suitable gas diffusion substrate known to those skilled in the art. Typical substrates include substrates based on carbon paper (eg Toray® paper available from Toray Industries, Japan), woven carbon cloths (eg Zoltek® PWB-3 available from Zoltek Corporation, USA) or non-woven carbon fibre webs (eg H-2135 available from Freudenberg, Germany). Suitably the gas diffusion substrate is between 100 and 300 µm thick.

Typically, gas diffusion substrates will have been treated with a hydrophobic polymer such as PTFE prior to the application of a microporous layer. The hydrophobic polymer is present throughout the substrate, rather then being present as a layer on the surface of the substrate. Substrates based on woven carbon cloths or non-woven carbon fibre webs may have been filled with a mixture of carbon particles and hydrophobic polymer (e.g. as described in EP 791 974) prior to the application of a microporous layer. The carbon/polymer fill is typically present throughout the thickness of the substrate.

The temperature of the pressing step is determined by the polymer that is present in the polymer layer. Suitably, the polymer is chosen such that the pressing step can be carried out between 50-150° C., preferably between 75-100° C.

If the polymer layer consists of a layer of adhesive, the firing step decomposes the adhesive and sinters the hydrophobic polymer in the microporous layer. If the polymer layer consists of a layer of hydrophobic polymer, the firing step sinters the hydrophobic polymer in the microporous layer and sinters the hydrophobic polymer in the polymer layer. The firing step is suitably carried out at more than 300° C.

In another embodiment of the present invention, the polymer layer can be present on a gas diffusion substrate rather than on a microporous layer supported on a transfer substrate. The microporous layer is transferred to the substrate as described above except that the polymer layer is present on the substrate rather than on the microporous layer, and the polymer bonds to the microporous layer rather than bonding to the substrate. The polymer layer may consist of a layer of adhesive or a layer of hydrophobic polymer, as described above. Furthermore, the present invention provides a process for depositing a microporous layer onto a gas diffusion substrate comprising the steps of:

a) taking a microporous layer supported on a transfer substrate, and positioning the microporous layer next to a gas diffusion substrate wherein a polymer layer is present on the gas diffusion layer, such that the microporous layer is adjacent to the polymer layer of the gas diffusion substrate;

b) pressing the microporous layer to the gas diffusion substrate, such that the polymer bonds to the microporous layer;

c) removing the transfer substrate; and d) firing.

The microporous layer, transfer substrate, gas diffusion substrate and preferred process conditions are as described above.

The gas diffusion substrates bearing microporous layers prepared using the processes of the invention are unlike those prepared by prior art methods, being more uniform in thickness. Additionally, when the polymer layer consists of an adhesive layer the microporous layer contains the residues of the adhesive (although these do not affect the functioning of the fuel cell). Therefore, the present invention further provides a gas diffusion substrate, wherein a microporous layer has been applied to the gas diffusion substrate by a process of the invention. The microporous layer is firmly adhered to the gas diffusion substrate and covers the fibres of the gas diffusion substrate effectively, whilst not penetrating significantly into the gas diffusion substrate. Suitably the microporous layer does penetrates less than 10% of the thickness of the gas diffusion substrate, preferably less than 5%, most preferably less than 1%.

The properties of the microporous layer on the gas diffusion substrate are substantially the same as the properties of the microporous layer when present on the transfer substrate. The microporous layer is suitably between 5 μm and 100 μm thick, preferably between 10 μm and 40 μm thick. Thinner layers may not provide a sufficiently smooth layer (fibres in the gas diffusion substrate may protrude) and thicker layers may lead to mass transport losses. The thickness of the microporous layer is suitably uniform across the entire layer such that the thinnest portion of the layer is at least 50% as thick as the thickest portion of the layer, preferably at least 75% as thick as the thickest portion of the layer, most preferably at least 90% as thick. The porosity of the layer is suitably greater than 70% to ensure effective mass transport. The pore sizes in the microporous layer preferably cover a wide range, e.g. from 10 μm up to 5 nm.

The invention further provides a method of preparing a gas diffusion electrode comprising a process for depositing a microporous layer onto a gas diffusion substrate as described above and a further step of applying an electrocatalyst ink to the microporous layer to provide an electrocatalyst layer.

Suitable electrocatalyst inks are described in, e.g. EP 731 520, and typically comprise an electrocatalyst and a polymer such as a proton-conducting polymer in a solvent such as water. The inks may be applied by methods known to the skilled person such as screen printing, spraying, K-bar methods or doctor blade techniques.

The invention further provides a method of preparing a membrane electrode assembly. In a first method, a microporous layer is deposited on a gas diffusion substrate as described above and then the gas diffusion substrate is combined with a catalysed membrane, such that the catalysed face of the membrane contacts the microporous layer. In a second method, a gas diffusion electrode is prepared as described above, and then the gas diffusion electrode is combined with a membrane.

EXAMPLES

The invention will now be described by way of example only which is not intended to be limiting thereof.

Comparative Example 1

An aqueous ink containing Shawinigan™ carbon black, polytetrafluoroethylene (10 wt % based on the weight of the carbon) and methylcellulose (2 wt % based on the weight of the water) was prepared. The ink was screen printed onto a H-2135 T10A carbon fibre substrate from Freudenberg. The substrate was heated to above 300° C. A microscope image of a cross-section of the substrate and microporous layer is shown in FIG. 1.

Example 1

The aqueous ink used in comparative example 1 was modified by addition of Surfynol™ S465 surfactant (0.5 wt % based on the weight of the carbon black). A layer of the aqueous ink and a layer of adhesive (Vinamul™ 8481 from National Starch) were applied to a 175 μm layer of BOPP polymer in a cascade coating process (the aqueous ink layer was applied directly to the BOPP polymer and the adhesive layer was applied to the aqueous ink layer). The amount of adhesive was between 1 and 2 g/m².

The adhesive layer was placed adjacent to a H-2135 T10A carbon fibre substrate from Freudenberg and the microporous layer was laminated to the substrate by pressing at 75-100° C. The BOPP polymer layer was removed. The substrate was heated to above 300° C.

Figure 2:
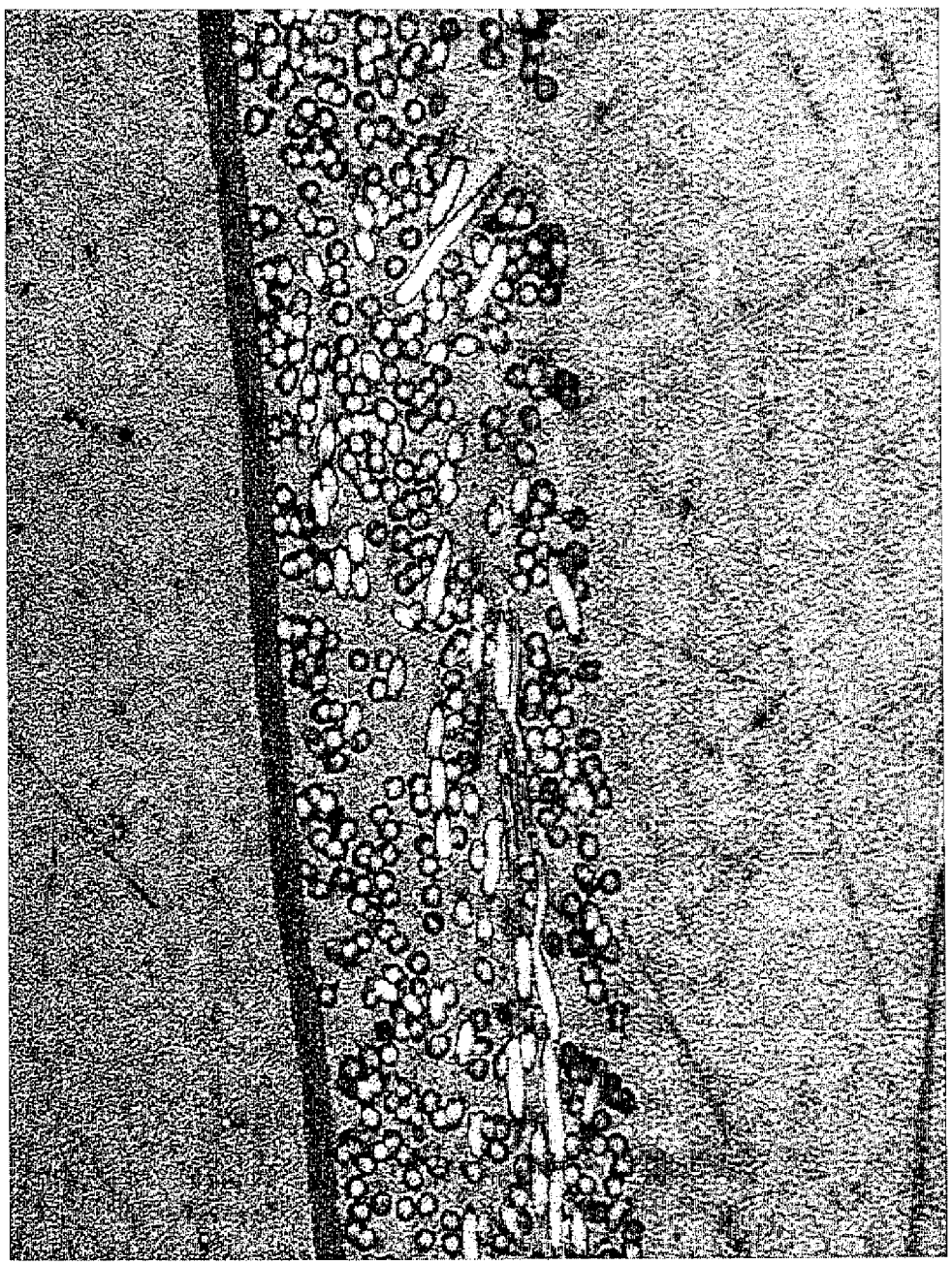
FIG. 2 shows a microscope image of a cross-section of the substrate and microporous layer according to example 1.

A microscope image of a cross-section of the substrate and microporous layer is shown in FIG. 2. The layer has a more uniform thickness than the microporous layer shown in FIG. 1 and produced according to comparative example 1.

Example 2

Example 1 was repeated except that the carbon fibre substrate was a TGP-60 substrate from Toray that had been treated with PTFE.

Figure 3:
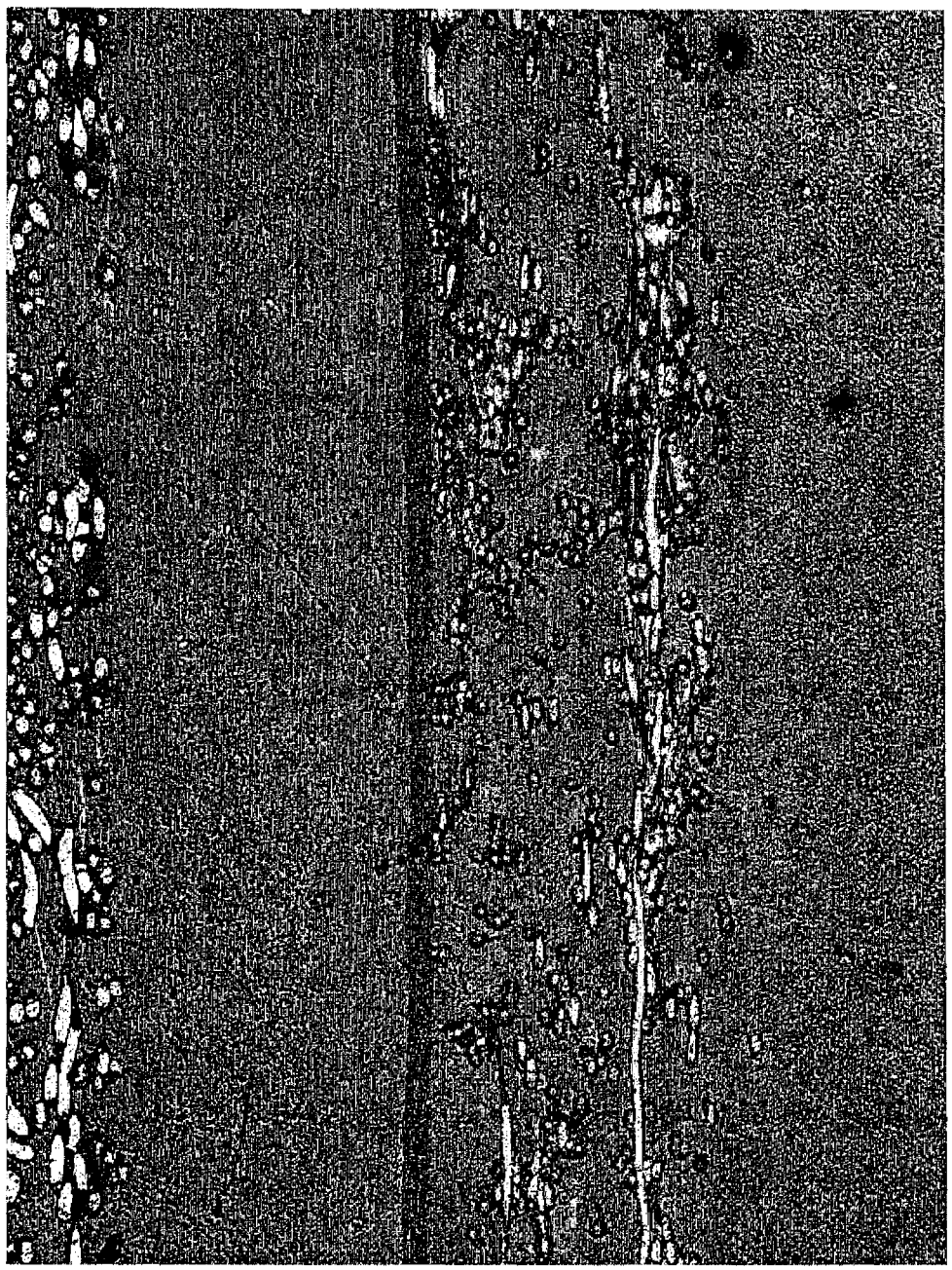
FIG. 3 shows a microscope image of a cross-section of the substrate and microporous layer according to example 2.

A microscope image of a cross-section of the substrate and microporous layer is shown in FIG. 3. The layer has a more uniform thickness than microporous layer shown in FIG. 1 and produced according to comparative example 1.

The invention claimed is:

1. A component for use in assembling a membrane electrode assembly for use in a fuel cell, said component consisting of (i) a transfer substrate selected from the group consisting of a biaxially oriented polypropylene, a polyurethane-coated paper, a silicone release paper and a metal foil; (ii) a microporous layer applied to the transfer substrate, the microporous layer consisting of carbon particles and a hydrophobic polymer; and (iii) a polymer layer consisting of a polymer present on a surface of the microporous layer not in contact with the transfer substrate;

wherein the transfer substrate is adapted to be removed from the microporous layer and is not present in the membrane electrode assembly as used in the fuel cell.

2. A component for use in assembling a membrane electrode assembly according to claim 1, wherein the hydrophobic polymer is polytetrafluoroethylene or fluorinated ethylene-propylene.

3. A component for use in assembling a membrane electrode assembly according to claim 1, wherein the weight ratio of carbon particles to hydrophobic polymer is between 20:1 and 2:1.

4. A component for use in assembling a membrane electrode assembly according to claim 1, wherein the microporous layer is between 10 µm and 40 µm thick.

5. A component for use in assembling a membrane electrode assembly according to claim 1, wherein the polymer layer consists of a layer of adhesive.

6. A component for use in assembling a membrane electrode assembly according to claim 5, wherein the adhesive is a thermoplastic adhesive.

7. A component for use in assembling a membrane electrode assembly according to claim 1, wherein the polymer layer consists of a layer of a hydrophobic polymer.

8. A component for use in assembling a membrane electrode assembly according to claim 1, wherein the transfer substrate is biaxially-orientated polypropylene.

* * * * *

UNITED STATES PATENT AND TRADEMARK OFFICE
CERTIFICATE OF CORRECTION

PATENT NO.        : 8,685,574 B2                                                          Page 1 of 1
APPLICATION NO.   : 12/278094
DATED             : April 1, 2014
INVENTOR(S)       : Hodgkinson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1162 days.

Signed and Sealed this

Twenty-ninth Day of September, 2015

Michelle K. Lee
*Director of the United States Patent and Trademark Office*